United States Patent [19]

Imabayashi et al.

[11] Patent Number: 5,306,790

[45] Date of Patent: Apr. 26, 1994

[54] PROCESS FOR PRODUCING STYRENIC POLYMER

[75] Inventors: Hideki Imabayashi; Kazutoshi Ishikawa; Yoshihiko Ishida, all of Ichihara, Japan

[73] Assignee: Idemitsu Petrochemical Co., Ltd., Tokyo, Japan

[21] Appl. No.: 953,846

[22] Filed: Sep. 30, 1992

[30] Foreign Application Priority Data

Jan. 10, 1991 [JP] Japan .................... 3-253570

[51] Int. Cl.⁵ .................... C08F 2/02; C08F 12/08
[52] U.S. Cl. .................... 526/68; 526/61; 526/88; 526/151; 526/347.2; 526/902
[58] Field of Search .................... 526/68, 88, 61, 151, 526/347.2, 902

[56] References Cited

U.S. PATENT DOCUMENTS

| | | | |
|---|---|---|---|
| 3,838,139 | 9/1974 | Latinen | 526/346 X |
| 3,859,268 | 1/1975 | Novack et al. | 526/347 X |
| 4,742,131 | 5/1988 | Asanuma et al. | |
| 5,037,907 | 8/1991 | Imabayashi et al. | |

Primary Examiner—Fred Teskin
Attorney, Agent, or Firm—Oblon, Spivak, McClelland, Maier & Neustadt

[57] ABSTRACT

There is disclosed a process for continuously and efficiently producing a styrenic polymer having a high degree of syndiotactic configuration which comprises effecting polymerization reaction by continuously introducing a styrenic monomer and a polymerization catalyst into a polymerization reactor, the inside of which has been brought into fluidized state by particles previously fed therein, which process is characterized in that the polymerization reactor temperature is controlled by vaporizing a part of the styrenic monomer which has been introduced into the polymerization reactor, while the inside of the reactor is maintained under reduced pressure. According to the above process, such problems as difficulty in polymerization reactor scale-up, adhesion of polymer to the reactor inside and polymer particle agglomerate are simultaneously solved, and thereby the industrial significance of the process is remarkably enhanced.

3 Claims, 1 Drawing Sheet

PROCESS FOR PRODUCING STYRENIC POLYMER

BACKGROUND OF THE INVENTION

1. Field of the Invention

The present invention relates to a process for producing a styrenic polymer. More particularly it pertains to a process for efficiently producing a styrenic polymer in which the stereochemical structure of the main polymer chain is of high degree of syndiotactic configuration.

2. Description of Relates Art

Styrenic polymers having a stereostructure of atactic or isotactic configuration have heretofore been well known, but there have recently been developed styrenic polymers having a stereostructure of predominant syndiotactic configuration, one of which, for example, is disclosed in Japanese Patent Application Laid-Open No. 187708/1987.

The styrenic polymer having syndiotactic configuration has heretofore been produced by batchwise or continuous system by the use of a tank type reactor equipped with agitating blades or the like, where the reaction heat generated through polymerization reaction and agitation heat are removed by cooling the reactor with a jacket fitted thereto.

Specifically, the styrenic polymer with syndiotactic configuration has a polymerization reaction heat of 160 kcal/kg, to which is added the agitation heat generated through the agitation in the polymerization reaction in the case of commercial operation of the reaction system. Here, the reaction heat and agitation heat are responsible for the trouble which hinders the proceeding of polymerization reaction such as agglomeration of the resultant polymer and adhesion of the polymer to the inside wall of the reactor. Consequently, the polymerization reactor is limited with respect to its capacity in the production of syndiotactic styrenic polymer insofar as the reactor equipped with a cooling jacket is employed for removing the reaction heat with agitation heat. Thus in the scale-up of the reactor for the purpose of enhancing the productivity of syndiotactic styrenic polymer, the removal of heat from inside of the reactor is an indispensable subject of utmost importance.

Under such circumstances facing the aforestated difficulty, intensive research and investigation were concentrated by the present inventors on the development of a continuous process for efficiently producing a styrenic polymer having a syndiotactic configuration, which process is capable of preventing the scaling of the polymer on the inside wall of the reactor as well as agglomeration thereof and at the same time, eliminating the problem of removing polymerzation reaction heat along with agitation heat in polymerization reaction and thereby efficiently operating the production plant.

As a result, it has been found by the present inventors that the aforesaid problems can be solved by the control of reaction temperature which takes advantage of the polymerization reaction heat in the reactor for the latent heat of vaporization for styrenic monomer. The present invention has been accomplished on the basis of the above-mentioned finding and information.

SUMMARY OF THE INVENTION

It is an object of the present invention to provide a process for efficiently and continuously producing a styrenic polymer having a high degree of syndiotactic configuration without the problem of polymer scaling or agglomeration.

It is another object of the present invention to provide a process for producing the same free from the reactor scale-up problem.

The present invention provides a process for producing a styrenic polymer having a high degree of syndiotactic configuration which comprises effecting polymerization reaction by continuously introducing a styrenic monomer as the starting material and a polymerization catalyst into a polymerization reactor, the inside of which has been brought into fluidized state by particles previously fed therein, said process being characterized in that the temperature in the polymerization reactor is controlled by vaporizing a part of the styrenic monomer which has been introduced into the polymerization reactor, while the inside of the reactor is maintained at reduced pressure.

SYMBOL

Figure 1:
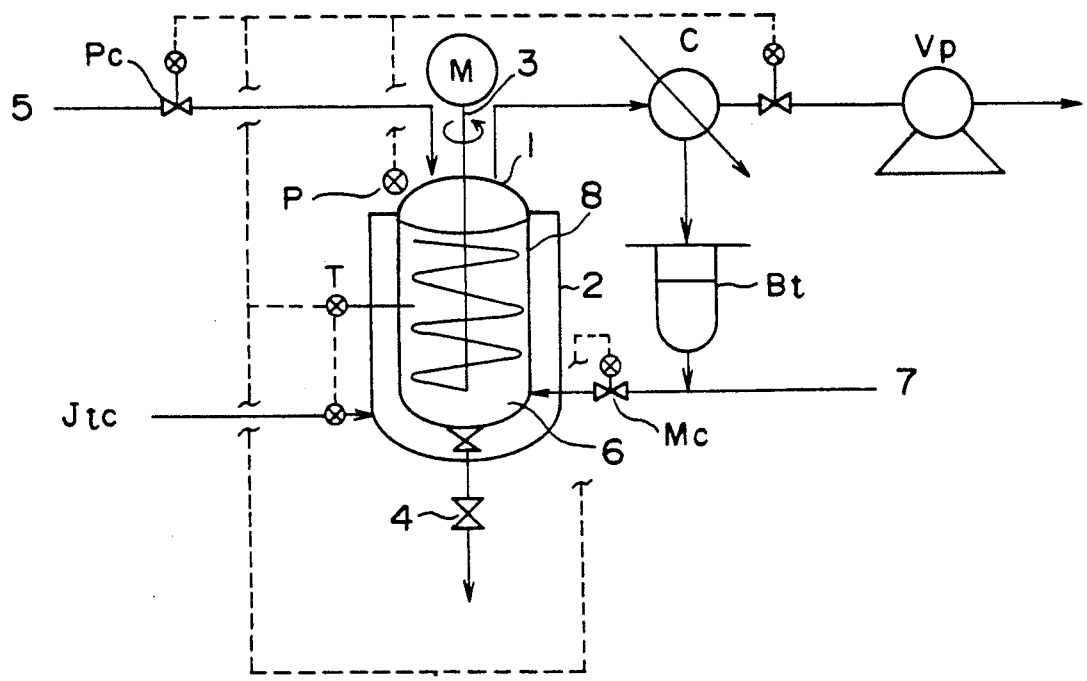
FIG. 1 is a schematic illustration showing an example of the apparatus for carrying out the process of the present invention.

1: Reactor
2: Jacket
3: Agitator
4: Discharge valves
5: Gas feed pipe
6: Particles
7: Styrenic monomer feed pipe
8: Catalyst feed pipe
Vp: Vacuum pump
Jtc: Jacket temperature control device
T: Thermometer for jacket temperature control
Pc: Pressure control device
P: Pressure transmitter
Mc: Reflux monomer flow control device
C: Condenser
Bt: Condensate buffer tank
M: Agitator motor

DESCRIPTION OF PREFERRED EMBODIMENTS

The styrenic monomer to be used in the present invention indicates styrene and/or styrene derivatives.

Specific examples of the styrene derivatives include alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene and p-tertiary-butylstyrene; halogenated styrenes such as p-chlorostyrene, m-chlrorostyrene, o-chlorostyrene, p-bromostyrene, m-bromostyrene, o-bromostyrene, p-fluorostyrene, m-fluorostyrene, o-fluorostyrene and o-methyl-p-fluorostyrene; alkoxystyrenes such as p-methoxystyrene, m-methoxystyrene, o-methoxystyrene, p-ethoxystyrene, m-ethoxystyrene, and o-ethoxystyrene; carboxyesterstyrenes such as p-carboxymethylstyrene, m-carboxymethylstyrene, and o-carboxymethylstyrene; alkyletherstyrenes such as p-vinylbenzylpropylether; divinylbenzene; or mixture of two or more kinds of them. In addition to the above, there is usable a comonomer other than the aforementioned styrenic monomer to the extent that the use of the comonomer does not exert adverse influenece on the syndiotactic configuration.

Such comonomer is exemplified by acrylonitrile, butadiene and isoprene.

In producing a styrenic polymer having a high degree of syndiotactic configuration by polymerizing at least one of the above-mentioned styrenic monomers, the catalyst to be used plays an important role. there are available a variety of catalysts. In the present invention, a styrenic polymer having a high degree of syndiotactic configuration is obtained by the use the catalyst comprising, for example (A) (1) an aluminoxane or (2) a coordination complex compound comprising a cation and an anion in which a plurality of radicals are bounded to a metal and (B) a transition metal compound typified by a titanium compound, each as a pricipal component.

The aluminoxane which is Component (A) of the catalyst to be used in the present invention is a compound obtained by contacting one of various organoaluminum compounds with a condensing agent. As the organoaluminum compound used as a starting material, an organoaluminum compound represented by the general formula:

$$AlR^1_3 \qquad (I)$$

Wherein $R^1$ is an alkyl group having 1 to 8 carbon atoms, more specifically, trimethylaluminum, triethylaluminum, triisobutylaluminum and the like can be mentioned, and among them trimethylaluminum is particulary desirable.

On the other hand, a typical example of the condensing agent for said organoluminum compound is water. In addition, any compound capable of undergoing a condensation reaction with an organoaluminum compound including alkylaluminum may be used.

Examples of the aluminoxane of Component (A) include chain alkylaluminoxane represented by the general formula:

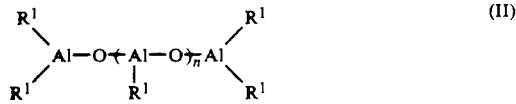

(II)

wherein n is a number from 2 to 50 indicating polymerization degree and $R^1$ is as previous defined, cycloalkylaluminoxane having the repeating unit represented by the general formula:

(III)

wherein $R_1$ is as previously defined and the like. Of these alkylaluminoxanes, that wherein $R^1$ is a methyl group, i.e. methylaluminoxane is particularly desirable.

Generally, the reaction product of an alkylaluminum compound such as trialkylaluminum with water includes the above-mentioned chain alkylaluminoxane and cycloalkylaluminoxane, unreacted trialkylaluminum, a mixture of various condensation products, and further complicatedly associated molecules thereof, which becomes various products according to the contacting conditions of the alkylaluminum compound and water.

The reaction of the alkylaluminum compound with water is not specifically limited, but can be performed according to any of known methods; for example, (1) a method in which an alkylaluminum compound is dissolved in an organic solvent and then contacted with water; (2) a method in which an alkylaluminum compound is added at the time of polymerization, and then water is added; and (3) a method in which an alkylaluminum compound is reacted with water of crystallization as contained in metal salts and the like, or water absorbed on inorganic or organic compounds. The above water may contain ammonia, amine such as ethylamine, sulfur compound such as hydrogen sulfide, phosphorus compound such as phosphite and the like up to the proportion of about 20%.

The aluminoxane, especially alkylaluminoxane to be used in the present invention is prepared by a method in which, when a hydrated compound is used, the resultant solid residue is filtered after the above contact reaction and the filtrate is heated under atmoshperic pressure or reduced pressure at a temperature of 30° to 200° C., preferably 40° to 150° C. for from 20 minutes to 8 hours, preferably from 30 minutes to 5 hours while distilling away the solvent. The temperature for the heat treatment may be determined optionally depending on various conditions, but is usually in the above range. If the temperature is lower than 30° C., effects cannot be obtained, and if it exceeds 200° C., aluminoxane itself is undesirably pyrolyzed. Depending on the conditions of the heat treatment, the reaction product is obtained as a colorless solid or solution. The product thus obtained can be used as a catalyst solution, if necessary, by dissolving in or diluting with a hydrocarbon solven.

In the process according to the present invention, there may be used a coordination complex compound comprising a cation and an anion in which a plurality of radicals are bonded to a metal as Component (A)-(2) of the catalyst in place of the foregoing aluminoxane. A variety of such coordination complex compounds are available, and those represented by the following general formula (IV) or (V) are preferably employed:

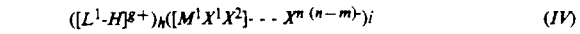

(IV)

or

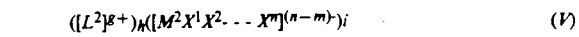

(V)

wherein $L^2$ is $M^3$, or $T^1T^2M^4$ or $T^3{}_3C$ as hereinafter described; $L_1$ is a Lewis base; $M^1$ and $M^2$ are each a metal selected from Groups 5 to 15 of the Periodic Table; $M^3$ is a metal selected from Groups 8 to 12 of the Periodic Table; $M^4$ is a metal selected from Groups 8 to 10 of the Periodic Table; $X^1$ to $X^n$ are each a hydrogen atom, dialkylamino group, alkoxy group, aryloxy group, alkyl group having 1 to 20 carbon atoms, aryl group having 6 to 20 carbon atoms, alkylaryl group, arylalkyl group, substituted alkyl group, organometalloid group or halogen atom; $T^1$ and $T^2$ are each a cyclopetnadienyl group, substituted cyclopentadienyl group, indenyl group or fluorenyl group; $T^3$ is an alkyl group; m is the valency of each of $M^1$ and $M^2$, indicating an integer of 1 to 7; n is an integer of 2 to 8; g is the ion valency of each of $[L^1—H]$ and $[L^2]$, indicating an integer of 1 to 7; h is an integer of 1 or more; and $i = hxg/(n-m)$.

Specific examples of $M^1$ and $M^2$ include B, Al, Si, P, As, Sb, etc.; those of $M^3$ include Ag, Cu, etc.; and those of $M^4$ include Fe, Co, Ni, etc. Specific examples of $X^1$ to $X^n$ include dialkylamino group such as dimethylamino and diethylamino; alkoxyl group such as methoxyl, ethoxyl and n-butoxyl; aryloxyl group such as phenoxyl, 2,6-dimethylpheoxyl and naphthyloxyl; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid such as pentamethylantimony group, trimethylsilyl group, trimethylgermyl group, diphenylarsine group, dicyclohexylantimony group and diphenylboron group. Specific examples of substituted cyclopentadienyl group of $T^1$ and $T^2$ include methylcyclopentadienyl, butylcyclopentadienyl and pentamethylcyclopentadienyl.

Among the compounds represented by the general formula (IV) or (V), specific examples of preferably usable compounds include, as the compound of general formula (IV), triethylammonium tetraphenylborate, tri(n-butyl)ammonium tetraphenylborate, trimethylammonium tetraphenylborate, triethylammonium tetra(pentafluorophenyl)borate, tri(n-butyl)ammonium tetra(pentafluorophenyl)borate, triethylammonium hexafluoroarsenate, etc., and as the compound of general formula (V), pyridinium tetra(pentafluorophenyl)borate, pyrrolinium tetra(pentafluorophenyl)borate, N,N-dimethylanilinium tetra(pentafluorophenyl)borate, methyldiphenylammonium tetra(pentafluorophenyl)borate, ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityl tetraphenylborate, trityl tetra(pentafluorophenyl)borate, silver hexafluoroarsenate, silver hexafluoroantimonate, silver tetrafluoroborate, etc.

On the contrary, as transition metal compounds which constitutes Component (B) of the catalyst of the present invention include a compound of a group 3 to 6 metal of the Periodic Table and a compound of lanthanum series metal, of which is preferable a compound of a group 4 metal (titanium, zirconium, hafnium, vanadium, etc.). Various titanium compounds can be used and a preferred example is at least one compound selected from the group consisting of titanium compounds and titanium chelate compounds represented by the gneral formula:

$$TiR^2{}_aR^3{}_bR^4{}_cR^5{}_{4-(a+b+c)} \qquad (VI)$$

or

$$TiR^2{}_dR^3{}_eR^4{}_{3-(d+e)} \qquad (VII)$$

wherein $R^2$, $R^3$, $R^4$ and $R^5$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c are each an integer from 0 to 4; and d and e are each an integer from 0 to 3.

$R^2$, $R^3$, $R^4$ and $R^5$ in the formulae (VI) and (VII) each represent a hydrogen atom, an alkyl group having 1 to 20 carbon atoms (specifically, methyl group, ethyl group, propyl group, butyl group, amyl group, isoamyl group, isobutyl group, octyl group and 2-ethylhexyl group), an alkoxy group having 2 to 20 carbon atoms (specifically, methoxy group, ethoxy group, propoxy group, butoxy group, amyloxy group, hexyloxy group, and 2-ethlhexyloxy group), an aryl group having 6 to 20 carbon atoms, an alkylaryl group, an arylalkyl group (specifically, phenyl group, tolyl group, xylyl group and benzyl group), an acyloxy group having 1 to 20 carbon atoms (specifically, heptadecylcarbonyloxy group), a cyclopentadienyl group, a substituted cyclopentadienyl group (specifically, methylcyclopentadienyl group, 1,2-dimehtylcyclopentadienyl group and pentamethylcyclopentadienyl group), an indenyl group or a halogen atom (specifically, chlorine, bromine, iodine and fluorine). These $R^2$, $R^3$, $R^4$ and $R^5$ may be the same as or different from each other. Furthermore, a, b and c are each an integer from 0 to 4, and d and e are each an integer from 0 to 3.

More desirably titanium compounds include a titanium compound represented by the formula:

$$TiRXYZ \qquad (VIII)$$

wherein R represents a cyclopentadienyl group, a substituted cyclopentadienyl group or an indenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom.

The substituted cyclopentadienyl gorup represented by R in the above formula is, for example, a cyclopentadineyl group substituted by at least one of an alkyl group having 1 to 6 carbon atoms, more specifically, methylcyclopentadienyl group, 1,2-dimethylcyclopentadienyl group pentamethylcyclopentadienyl group or the like. In addition, X, Y and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group, ethoxy group, propoxy group, butoxy group, amyloxy group, hexyloxy group, octyloxy group and 2-ethylhexyl group), an aryl group having 6 to 20 carbon atoms (specifically, phenyl group and naphthyl group), an aryloxy group having 6 to 20 carbon atoms (specifically, phenoxy group), an arylalkyl group having 6 to 20 carbon atoms (specifically, benzyl group) or a halogen atom (specifically, chlorine, bromine, iodine and fluorine).

Specific examples of the titanium compound represented by the formula (VIII) include cyclopentadienyltirmethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamehtylcyclopentadienyltributyltitanium, cyclopentadienylmethyltitanium dichloride, cyclopentadienylethyltitanium dichloride, pentamethylcyclopentadienylmethyltitanium dichloride, pentamehtylcyclopentadienylethyltitanium dichloride, pentamethylcyclopentadienylethyltitanium dichloride, cyclopentadienyldimethyltitanium monochloride, cyclopentadienyldiethyltitanium monochloride, cycloeptnadienyltitanium trimethoxide, cyclopcntadienyltitnaium triethoxide, cyclopentadienyltitanium tripropoxide, cyclopentadienyltitanium tirphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, and indenyltribenzyltitanium.

Of these titanium compounds, a compound not containing halogen atom is preferred and a titanium compound having one π electron type ligand as mentioned above is particularly desirable.

Furthermore, a condensed titanium compound represented by the general formula may be used as the titanium compound.

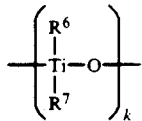

(IX)

wherein $R^6$ and $R^7$ each represent a halogen atom, an alkoxy group having 1 to 20 carbon atoms or an acyloxy group; and k is an integer from 2 to 20.

Furthermore, the above titanium compounds may be used in the form of a complex formed with an ester or an ether.

The trivalent titanium compound represented by the formula (VII) typically includes a trihalogenated titanium such as titanium tirchloride; and a cyclopentadienyltitanium compound such as cyclopentadienyltitnaium dichloride, and also those obtained by reducing a tetravalent titanium compound. These trivalent titanium compounds may be used in the form of a complex formed with an ester or an ether.

In addition, exmaples of the zirconium compound used as the transition metal compound include tetrabenzylzirconium, zirconium tetraethoxide, zirconium tetrabutoxide, bisindenylzirconium dichloride, triisopropoxyzirconium chloride, zirconium benzyl dichloride and tributoxyzirconium chloride. Examples of the hafnium compound include tetrabenzylhafnium, hafnium tetraethoxide and hafnium tetrabutoxide. Examples of the vanadium compound include vanadyl bisacetylacetonate, vanadyl triacetylacetonate, vanadyl triethoxide and vanadyl tripropoxide. Of these transition metal compounds, the titanium compounds are particularly suitable.

Aside from the forgoing, the trnasition-metal compounds constituting Component (B) of the catalyst include the transiton-metal compound with two ligands having conjugated π electrons, for example, at least one comound selected from the transitional-metal compound represented by the general formula $$M^5 R^8 R^9 R^{10} R^{11}$$ (X)

wherein $M^5$ is titanium, zirconium or hafnium; $R^8$ and $R^9$ are each a cyclopentadienyl group, substituted cyclopentadienyl group, indenyl group or fluorenyl group; and $R^{10}$ and $R^{11}$ are each a hydrogen atom, a halogen atom, hydrocarbon radical having 1 to 20 carbon atoms, alkoxy group having 1 to 20 carbon atoms, amino group or thioalkoxyl group having 1 to 20 carbon atoms, but $R^8$ and $R^9$ may be each cross-linked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of and $R^8$ and $R^9$ designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(-trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-tri(tert-butyl)cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and cross-linked by a alkylidene group having 1 to 5 carbon atoms, more specifically, methine group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^{10}$ and $R^{11}$ independently indicates, as described above but more specifically, a hydrogen atom; an alkyl group having 1 to 20 carbon atoms such as methyl group, ethyl group, propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxyl group, hexyloxyl group, octyloxyl group or 2-ethylhexyloxyl group; an aryloxyl group having 6 to 20 carbon atoms such as phenoxyl group; an amino group; or a thioalkoxyl group having 1 to 20 carbon atoms.

Specific examples of the transition-metal compounds represented by the general formula (X) include bis(cyclopentadienyl)dimethyltitanium; bis(cyclopentadienyl)diethyltitanium; bis(cyclopentadienyl)dipropyltitanium; bis(cyclopentadienyl)dibutyltitanium; bis(methylcyclopentadienyl)dimethyltitanium; bis(tertbutylcyclopentadienyl)dimethyltitanium; bis(1,3-dimethylcyclopentadienyl)dimethyltitanium; bis(1,3-di-tertbutylcyclopentadienyl)dimethyltitanium; bis(1,2,4-trimethylcyclopentadienyl)dimethyltitanium; bis(1,2,3,4-tetramethylcyclopentadienyl)dimethyltitanium; bis(trimethylsilylcyclopentadienyl)dimethyltitanium; bis(1,3-di(trimethylsilyl)cyclopentadienyl)- dimethyltitanium; bis(1,2,4-tri((trimethylsilyl)cyclopentadienyl) dimethyltitanium; bis(indenyl)dimethyltitanium; bis(fluorenyl)dimethyltitanium; methylenebis(cyclopentadienyl)dimethyltitanium; ethylidenebis(cyclopentadienyl)dimethyltitanium; methylenebis(2,3,4,5-tetramethylcyclopentadienyl) dimethyltitanium; ethylidenebis(2,3,4,5-tetramethylcyclopentadienyl)dimethyltitanium; dimethylsilylbis(2,3,4,5-tetramethylcyclopentadienyl) dimethyltitanium; methylenebisindenyldimethyltitanium; ethylidenebisindenyldimethyltitanium; dimethylsilylbisindenyldimethyltitanium; methylenebisfluorenyldimethyltitanium; ethylidenbisfluorenyldimethyltitanium; dimethylsilylbisfluorenyldimethyltitanium; methylene(tertbutylcyclopentadienyl)(cyclopentadienyl)dimethyltitanium; methylene(cyclopentadienyl)(indenyl)dimethyltitanium; ethylidene(cyclopentadienyl)(indenyl)dimethyltitanium; dimethylsilyl(cyclopentadienyl)(indenyl)dimethyltitanium; methylene(cyclopentadienyl)(fluorenyl)dimethyltitanium; ethylidene(cyclopentadienyl)(fluorenyl)dimethyltitanium; dimethylsilyl(cyclopentadienyl)(fluorenyl)dimethyltitanium; methylene(indenyl)(fluorenyl)dimethyltitanium; ethylidene(indenyl)(fluorenyl)dimethyltitanium; dimethylsilyl(indenyl)(fluorenyl)dimethyltitanium; bis(cyclopentadienyl)dibenzyltitanium; bis(tert-butylcyclopentadienyl)dibenzyltitanium; bis(methylcyclopentadienyl)dibenzyltitanium; bis(1,3-dimethylcyclopentadienyl)dibenzyltitanium; bis(1,2,4-trimethylcyclopentadienyl)dibenzyltitanium; bis(1,2,3,4-tetramethylcyclopentadienyl)dibenzyltitanium; bis(pentamethylcyclopentadienyl)dibenzyltitanium; bis(trimethylsilylcyclopentadienyl)dibenzyltitanium; bis[1,3-di(trimethyl)cyclopentadienyl]dibenzyltitanium; bis[1,2,4-tri(trimethylsilyl)cyclopentadienyl]dibenzyltitanium; bis(indenyl)dibenzyltitanium; bis(fluorenyl)dibenzyltitanium; methylenebis(cyclopentadienyl)dibenzyltitanium; ethylenebis(cyclopentadienyl)dibenzyltitanium; methylenebis(2,3,4,5-tetramethylcyclopentadienyl) dibenzyltitanium; ethylidenebis(2,3,4,5-tetramethylcyclopentadienyl)dibenzyltitanium; dimethylsilylbis(2,3,4,5-tetramethylcyclopentadienyl) dibenzyltitanium; methylenebis(indenyl)dibenzyltitanium; ethylidenebis(indenyl)dibenzyltitanium; dimethylsilylbis(indenyl)dibenzyltitanium; methylenebis(fluorenyl)dibenzyltitanium; ethylidenebis(fluorenyl)dibenzyltitanium; dimethylsilylbis(fluorenyl)dibenzyltitanium; methylene(cyclopentadienyl)(indenyl)dibenzyltitanium; ethylidene(cyclopentadienyl)(indenyl)dibenzyltitanium; dimethylsilyl(cyclopentadienyl)(indenyl)dibenzyltitanium; methylene(cyclopentadienyl)(fluorenyl)dibenzyltitanium; ethylidene(cyclopentadienyl)(fluorenyl)dibenzyltitanium; dimethylsilyl(cyclopentadienyl)(fluorenyl)dibenzyltitanium; methylene(indenyl)(fluorenyl)dibenzyltitanium; ethylidene(indenyl)(fluorenyl)dibenzyltitanium; dimethylsilyl(indenyl)(fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium dipheoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl)titanium dimethoxide; bispentamethylcyclopentadienyltitanium dimethoxide; bis(trimethylcyclopentadienyl)titanium dimethoxide; bis[1,3-di(trimethylsilyl)cyclopentadienyl]titanium dimethoxide; bis[1,2,4-tri(trimethylsilyl)cyclopentadienyl]titanium dimethoxide; bisindenyltitanium dimethoxide; bisfluorenyltitanium dimethoxide; methylenebiscyclopentadienyltitanium dimethoxide ethylidenebiscyclopentadienyltitanium dimethoxide; methylenebis(2,3,4,5-tetramehtylcyclopentadienyl)titanium dimethoxide; ethylidenebis(2,3,4,5-tetramethylcyclopentadienyl)titanium dimethoxide dimethylsilylbis(2,3,4,5-tetramethylcyclopentadienyl)titanium dimethoxide; methylenebisindenyltitanium dimethoxide; methylenebis(methylindenyl)titanium dimethoxide; ethylidenebisindenyltitanium dimethoxide; dimethylsilylbisindenyltitanium dimethoxide; methylenebisfluorenyltitanium dimethoxide; methylenebis(methylfluorenyl)titanium dimethoxide; ethylidenebisfluorenyltitanium dimethoxide; dimethylsilylbisfluorenyltitanium dimethoxide; methylene(cyclopentadienyl)(indenyl)titanium dimethoxide; ethylidene(cyclopentadienyl)(indenyl)titanium dimethoxide; dimethylsilyl(cyclopentadienyl)(indenyl)titanium dimethoxide; methylene(cyclopentadienyl)(fluorenyl)titanium dimethoxide; ethylidene(cyclopentadienyl)(fluorenyl)titanium dimethoxide; dimethylsilyl(cyclopentadienyl)(fluorenyl)titanium dimethoxide; methylene(indenyl)(fluorenyl)titanium dimethoxide; ethylidene(indenyl)(fluorenyl)titanium dimethoxide; dimethylsilyl(indenyl)(fluorenyl)titanium dimethoxide, etc.

Examples of the transition-metal compounds represented by the formula (X) wherein $M^5$ is zirconium include ethylidenebiscyclopentadienylzirconium dimethoxide, dimethylsilylbiscyclopentadienylzirconium dimethoxide, etc. Examples of the hafnium compounds according to the general formula (X) include ethylidenebiscyclopentadienylhafnium dimethoxide, dimethylsilylbiscyclopentadienylhafnium dimethoxide, etc. Particularly desirable transition-metal compounds among them are titanium compounds.

In addition to the combinations of the above, the compound may be a bidentate coordination complex compound such a 2,2'-thiobis(4-methyl-6-tert-butylphenyl)titanium diisopropoxide; 2,2'-thiobis(4-methyl-6-tertbuthylphenyl)titanium dimethoxide or the like.

In the process of the present invention, if desired, in addition to the aforestated Components (A) and (B), another catalytic component such as an organoaluminum can be added.

The organoaluminum includes an organoaluminum compound represented by the formula:

$$R^{12}_j Al(OR^{13})_x H_y X'_z \qquad (XI)$$

wherein $R^{12}$ and $R^{13}$ each independently represent an alkyl group having 1 to 8, preferably 1 to 4 carbon atoms; X' represents a halogen; j, x, y and z each satisfy the relations $0 < j \leq 3$, $0 \leq x < 3$, $0 \leq y < 3$ and $0 \leq z < 3$, and $j + x + y + z = 3$.

The activity of the catalyst is further improved by adding the above compound.

The organoaluminum compound represented by the above general formula (XI) can be exemplified as shown below. Those corresponding to $y = z = 0$ are represented by the formula: $R^{12}_j Al(OR^{13})_{3-j}$ (wherein $R^{12}$ and $R^{13}$ are as previously defined and j is preferably a number of $1.5 \leq j \leq 3$). Those corresponding to $x = y = 0$ are represented by the formula: $R^{12}_j AlX'_{3-j}$ (wherein $R^{12}$ and X' are as previously defined and j is preferably a number of $0 < j < 3$). Those corresponding to $x=z=0$ are represented by the formula: $R^{12}{}_jAlH_{3-j}$ (wherein $R^{12}$ is as previously defined and j is preferably a number of $2 \leq j \leq 3$). Those corresponding to $y=0$ are represented by the formula: $R^{12}{}_jAl(OR^{13})_xX'_z$ (wherein $R^{12}$, $R^{13}$ and $X'$ are as previously defined and $0<j\leq3$, $0\leq x<3$, $0\leq z<3$ and $j+x+z=3$).

In the organoaluminum compound represented by the general formula (XI), the compound wherein $y=z=0$ and $j=3$ is selected from, for example, trialkylaluminum such as trimethylaluminum, triethylaluminum and tributylaluminum, or combination thereof. In the case of $y=z=0$ and $1.5\leq j<3$, included are dialkylaluminum alkoxide such as diethylaluminum ethoxide and dibutylaluminum butoxide; alkylaluminum sesquialkoxide such as ethylaluminum sesquiethoxide and butylaluminum sesquibutoxide; as well as partially alkoxylated alkylaluminum having an average composition represented by $R^{12}{}_{2.5}Al(OR^{13})_{0.5}$. Examples of the compound corresponding to the case where $x=y=0$ include a partially halogenated alkylaluminum including dialkylaluminum halogenide $(j=2)$ such as diethylaluminum chloride, dibutylaluminum chloride and diethylaluminum bromide; alkylaluminum sesquihalogenide $(j=1.5)$ such as ethylaluminum sesquichloride, butylaluminum sesquichloride and ethylaluminum sesquibromide; and alkylaluminum dihalogenide $(j=1)$ such as ethylaluminum dichloride, propylaluminum dichloride and butylaluminum dibromide. Examples of the compound corresponding to the case in which $x=z=0$ includes a partially hydrogenated alkylaluminum including dialkylaluminum hydride $(j=2)$ such as diethylaluminum hydride and dibutylaluminum hydride; alkylaluminum dihydride $(j=1)$ such as ethylaluminum dihydride and propylaluminum dihydride. Examples of the compound corresponding to the case in which $y=0$ include a partially alkoxylated or halogenated alkylaluminum such as ethylaluminumethoxy chloride, butylaluminumbutoxy chloride and ethylaluminumethoxy bromide $(j=x=z=1)$. Of these, triisobutylaluminum and triisobutylaluminum hydride are particularly suitable.

The catalyst to be used in the present invention comprises Components (A) and (B) as the main components, and in addition, other catalytic component may be added if desired. The ratio of Components (B) to (A) in said catalyst depends on various conditions, and cannot be defined unconditionally, but usually it is, in terms of the ratio of the metal in Component (B) to aluminum in Component (A) i.e., metal/aluminum (molar ratio), 1:1 to 1; $10^6$, preferably 1:10 to 1:$10^4$ in the case of (1) aluminoxane; 0.1:1 to 1:0.1 in the case of (2) coordination complex compound comprising a cation and an anion in which a plurality of radicals are bonded to a metal; and 1:0.1 to 1:$10^3$ in the case of the organolaluminum compound (XI) being added as a catalyst component.

A styrenic monomer, that is, styrene or a derivative thereof which corresponds to the objective styrenic polymer may be polymerized or copolymerized in a bulk particle bed or a solvent such as an aliphatic hydrocarbon exemplified by pentane, hexane and heptane; an alicyclic hydrocarbon exemplified by cyclohexane; or a aromatic hydrocarbon exemplified by benzene, toluene and xylene. In the case of slurry polymerization, a styrenic monomer is preferably polymerized in a concentrated slurry from the viewpoint of productivity with a styrenic monomer concentration by volume of desirably 50% by volume or higher, more desirably 70% by volume or higher. The slurry polymerization in the present invention enables the production of the polymer having a high bulk density, favorable impregnating property of an aromatic solvent into the polymer and satisfactory deashability, whereas the bulk polymerization excels in productivity.

The polymerization operation is carried out in the following manner to produce the styrenic polymer in a reactor by the use of the styrenic monomer and the catalyst.

First of all, the reactor is vacuum-dried at 90° C. or higher for 30 minutes or longer and charged with sufficiently dried particles, the charge of which is not specifically limited but should be at least such that the particles can freely flow and be agitated when the agitating blades are operated. As a general rule, the particles as the seed powder are fed in an amount of 60 to 70% based on the reactor volume so as to enable the particle bed to be sufficiently agitated at a reasonable agitating velocity and to attain fluidized state. As the particle species to be employed in the particle bed, the particle of the styrenic polymer having syndiotactic configuration is most desirable, but as the alternative thereto, a resin powder such as polypropylene powder and polyethylene powder or an inorganic powder such as silica may be used. The average particle size of each of the powders is preferably 0.1 to 5 mm on an ordinary occasion.

The reactor inside in an fluidized state in which the particles are introduced and agitated is maintained at a prescribed reaction temperature by regulating the temperature of the refrigerant to be circulated in the jacket.

The styrenic monomer to be used in the reaction system should be completely freed of catalyst poison such as moisture, oxygen and phenylacetylene. For this reason, there is used the styrenic monomer pretreated, for example, by a method wherein the monomer is subjected to nitrogen bubbling, passed through an activated alumina column and further treated by hydrogenation reaction by the use of a palladium catalyst.

At the time of attaining fluidized state in which the particles as the seed powder are introduced, sufficiently agitated and mixed in the particle bed with an agitator and regulated to a prescribed temperature to stabilize the reactor temperature, there are fed to the reactor the styrenic monomer that has been pretreated by hydrogenation reaction with a palladium catalyst or the like and the polymerization catalyst. The method and the order of feeding starting materials including the styrenic monomer and additives are not specifically limited.

The charge of the styrenic polymer is gradually increased until the prescribed total charge is attained, when the reaction temperature is regulated to maintain at a constant temperature as much as possible. It is preferable in the present invention to adopt cascade control system in which the polymerization reaction temperature is controlled with the reactor pressure and simultaneously flow rate control of reflux monomer is effected. In more detail, the reaction temperature is controlled by means of pressure control in which the reactor is evacuated with a vacuum pump to vaporize a portion of the supplied styrenic monomer and thereby remove the reaction heat with agitation heat and cool the reactor content by utilizing the latent heat of vaporization. The vaporized styrenic monomer is condensed in a condenser, and the resultant condensate is refluxed to the reactor 1 so as to be utilized as at least a portion of the styrenic monomer as the starting material, while being controlled for flow rate to cool the reaction system by the sensible heat.

The polymerization reaction temperature is not specifically limited, but is usually 0° to 100° C., preferably 20° to 80° C. It is controlled in such a manner that when the reactor inside temperature is higher than the stipulated value, the degree of vacuum in the reactor or the reflux rate of the condensate is increased and vice versa, that is, when it is lower than the stipulated value, the degree of vacuum or the reflux rate is decreased.

On the other hand, the reactor pressure is adjusted generally at atmospheric pressure or lower, desirably at 5 mm Hg abs to 500 mmHg abs, more desirably at 25 mmHg to 400 mmHg abs by controlling the degree of vacuum in accordance with the temperature setting conditions for the polymerization reactor. When the reactor pressure is outside the above general scope, a reactor pressure exceeding 500 mmHg abs may cause insufficient cooling effect in the polymerization reactor, whereas a pressure lower than 5 mmHg abs may cause the reactor temperature to become too low to properly control the polymerization temperature. To increase the degree of vacuum in the reactor, the reactor inside may be evacuated with a vacuum pump and to decrease the degree of vacuum an inert gas such as nitrogen may be blown into the reactor.

As the polymerization reactor, there are available a tank type reactor, a self-cleaning type reactor (produced by Kurimoto Ltd. as self-cleaning type KRC reactor) or the like.

On reaching the specified level in the reactor, the polymer powder produced in the reactor is taken out by operating the discharge valve installed at the bottom of the reactor, specifically for example, by alternate operations of opening and closing of the valve, that is, by intermittently opening the valve for batchwise discharge of the product. The use of a screw feeder enables continuous discharge thereof.

As described hereinbefore according to the process of the present invention, the particles are fed in the reactor and uniformly agitated with an agitator to form fluidized state, followed by the feeding of the styrenic monomer as the starting material and the polymerization catalyst. Then, cascade control is carried out in combination with the reactor pressure so as to control the reactor temperature by the reactor pressure. During the operation, since the powder level in the reactor rises with the elapse of time after the start of styrenic monomer feeding, the formed polymer particles are optionally discharged from the reactor inside to outside the reaction system. Accordingly, as the polymerization reaction proceeds and the produced polymer is discharged outside the system, the initially fed particles into the reactor are replaced with the produced polymer particles, which thereafter function as the initially fed particles to continuously proceed with the polymerization reaction. Needless to say, the polymerization reaction may be effected by batchwise process by allowing the initially fed particles to exist until the completion of the reaction.

In what follows, the process of the present invention will be described with reference to the drawing.

FIG. 1 is an explanatory drawing showing an example of the apparatus suitable for putting the process of the present invention into practice.

Reactor 1 may be vertical or horizontal provided that it can be used for agitation mixing of a fluid or particle.

Reactor 1 is equipped on the external circumference thereof with jacket 2 having a temperature control device Jtc which effects heating and cooling, and also equipped with agitator 3 with agitating blades to be used for agitating the fed particles and the polymer particles formed by polymerization reaction and constituting a fluidized state, wherein the symbol M of agitator 3 denotes an electric motor. Reactor 1 is further equipped on the bottom thereof with a discharge valves 4 to be used for discharging the polymer particles produced by polymerization reaction.

The process of the present invention is put into practice using reactor 1 by the following steps. Firstly, reactor 1 is heated to an aimed temperature by the use of jacket 2 and vacuum dried with vacuum pump Vp. Then, nitrogen gas is introduced into reactor 1 through gas pipe 5 having pressure control device Pc to be used for controlling reaction temperature by linking pressure control device Pc to flow control device Mc to restore the pressure in reactor 1 and raise the temperature to a prescribed one. Reactor 1 thus regulated is charged with particle 6 in advance, made into internally fluidized state by agitating with agitator 3, stabilized to a prescribed temperature and subsequently charged with the pretreated styrenic polymer and the catalyst. After the reaction system is set to the prescribed condition, the feed rate of the styrenic monomer is gradually increased and the reactor-temperature/pressure cascade control is started to proceed with polymerization reaction. Specifically, in order to control the reaction temperature by the reactor pressure when the prescribed setting conditions are attained, reactor 1 is evacuated with vacuum pump Vp to vaporize a portion of the fed styrenic monomer for the removal of reaction heat and agitation heat. The vaporized styrenic monomer is condensed with condenser C. The resultant condensate is once stored in condensate buffer tank Bt and refluxed to reactor 1 while being controlled for flow rate to be used as at least a portion of the styrenic monomer as the starting material. Thus, the reaction temperature is controlled by pressure control together with erflux monomer flow control to proceed with polymerization reaction. When the polymer particles produced in reactor 1 reach the specified level in reactor 1, they are taken out outside the system through discharge values 4 installed a the bottom thereof, for example, by intermittently opening discharge values 4 for batchwise discharge of the product. The use of, for example, a screw feeder enables continuous discharge thereof.

The styrenic polymer obtained by the process according to the present invention has a high degree of syndiotactic configuration. Here, the styrenic polymer which has a high degree of the syndiotactic configuration means that its stereochemical structure is mainly the syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such a high degree of syndiotactic configuration" as mentioned in the present invention means polystyrene, poly(alkylstyrene), poly(halogenated styrene), poly(alkoxystyrene), poly(vinyl benzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. Poly(alkylstyrene) include poly(methylstyrene), poly(ethylstyrene), poly(isopropylstyrene), poly(tert-butylstyrene) etc., poly(halogenated styrene) include poly(chlorostyrene), poly(bromostyrene), poly(fluorostyrene), etc, and poly(alkoxystyrene) include poly(methoxystyrene, poly(ethoxystyrene), etc.

The most desirable styrene polymers among them are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

The styrenic polymer obtained according to the process of the present invention is that with a high degree of syndiotacticity usually having a weight-average molecular weight of 10,000 to 10,000,000, preferably 100,000 to 5,000,000 with a number-average molecular weight of 5,000 to 5,000,000, preferably 50,000 to 2,500,000. Moreover, the styrenic polymer having an exceptionally high degree of syndiotacticity as well as an extremely high purity can be obtained by the steps of deashing treatment of the polymer thus obtained, as required, with a washing agent containing hydrochloric acid, etc.; additional washing; drying under reduced pressure; cleaning with a solvent such as methyl ethyl ketone for removing solubles therein; and treatment of the insolubles thus obtained by the use of chloroform, etc.

The styrenic polymer with a high degree of syndiotacticity has a melting point of 160° to 310° C. and is remarkably superior to the conventional styrenic polymer with an atactic configuration in terms of heat resistance.

According to the process of the present invention, the problem of reactor scale-up can be solved by the method wherein the reaction temperature is controlled by reactor pressure control together with reflux monomer flow control during the course of polymerization reaction. Concurrently, the styrenic polymer having a high degree of syndiotactic configuration can be continuously produced over a long period of time without causing such troubles as the adhesion of the polymer on the inside wall of the reactor resulting from reaction heat or agglomeration of the polymer. Accordingly, the process of the present invention greatly enhances the industrial value of itself as the industrial process for producing the styrenic polymer having a high degree of syndiotactic configuration.

In the following, the present invention will be described in more detail with reference to the non-limitative example and comparative examples.

EXAMPLE 1

A cleaned tank type reactor having 914 mm inside diameter, 1590 mm height and 1000 liter capacity equipped with double helical blades was heated to raise the temperature up to 90° C., vacuum dried for 3 hours, charged with nitrogen to restore the inside pressure and again heated to 80° C.

The reactor thus conditioned was charged with 650 liter of a styrenic polymer having syndiotactic configuration with an average particle size of 0.3 mm that had been prepared in advance and sufficiently dried, which was further dried in a stream of nitrogen for 2 hours and concurrently agitation was started at an agitational revolution of 60 rpm. When the reactor inside temperature was stabilized with the jacket temperature set to 75° C., starting material feeding was initiated with a pretreated styrenic monomer that had been subjected to nitrogen bubbling, deoxidation through activated alumina column, dehydration treatment and hydrogenation through a palladium catalyst column and polymerization catalyst.

The feed rate conditions were set to 90 liter/hr styrene monomer, 720 mmol/hr methylaluminoxane, 720 mmol/hr triisobutylaluminum and 7.2 mmol/hr pentamethylcyclopentadienyltitanium trimethoxide, whereupon cascade control that links the reactor inside temperature control to the reactor pressure control was initiated to attain a reaction temperature of 70° C. The unreacted styrene monomer vapor resulting from the above operation was condensed with a condenser. The resultant condensate was recovered in a buffer tank and refluxed into the reactor while the reflux flow rate was gradually increased to attain a final constant rate of 80 liter/hr for the continuous proceeding of polymerization reaction.

The styrenic polymer formed in the reactor was intermittently discharged through the discharge value installed at the bottom of the reactor with the discharge rate and frequency as under-mentioned.

Polymer powder discharge frequency once: (1)/2 min.

Polymer powder discharge rate: 71.2 kg/hr

During the continuous operation of the reaction system, the reactor inside temperature ranged from 69° to 71° C. and the reactor pressure from 150 to 300 mmHg abs. After an elapse of 200 hours from the start of the continuous polymerization reaction, the reactor was overhauled. As a result, the polymer stuck onto the inside wall thereof was only 5.3 kg.

The styrene polymer thus obtained had the following properties:

Bulk density of polymer powder: 0.35 g/cc
Conversion efficiency: 65.5%
Syndiotacticity: 98.4%
Weight-average molecular weight: 523,000

EXAMPLE 2

The procedure in Example 1 was repeated except that reactor inside temperature control was cascaded with the reactor pressure control to attain a reaction temperature of 85° C.

During the continuous operation of the reaction system, the reactor inside temperature ranged from 84° to 86° C. and the reactor pressure from 300 to 500 mmHg abs. After an elapse of 200 hours from the start of the continuous polymerization reaction, the reactor was overhauled. As a result, the polymer stuck onto the inside wall thereof was only 5.1 kg.

The styrene polymer thus obtained had the following properties:

Bulk density of polymer powder: 0.33 g/cc
Conversion efficiency: 64.3%
Syndiotacticity: 98.7%
Weight-average molecular weight: 357,000

EXAMPLE 3

The procedure in Example 1 was repeated except that the jacket was not used at all, that is, the cascade control was carried out in the same manner as Example 1.

During the continuous operation of the reaction system, the reactor inside temperature ranged from 69° to 71° C. and the reactor pressure from 150 to 300 mmHg abs. After an elapse of 200 hours from the start of the continuous polymerization reaction, the reactor was overhauled. As a result, the polymer stuck onto the inside wall thereof was 20.3 kg.

The styrene polymer thus obtained had the following properties:

Bulk density of polymer powder: 0.37 g/cc
Conversion efficiency: 64.9%
Syndiotacticity: 98.7%
Weight-average molecular weight: 534,000

COMPARATIVE EXAMPLE

The procedure in Example 1 was repeated except that reactor inside temperature control was not cascaded with the reactor pressure control, that is, it was carried out only with the jacket.

The different between the reaction temperature and the jacket temperature ranged from 35° to 40° C. after the start of the reactor operation. After an elapse of 60 hours from the start of continuous operation, however, the reactor temperature gradually rose, and at the time after 70 hours from the start thereof it reached 85° C. against the jacket temperature of 40° C., showing the tendency of further rising. When 80 hours elapsed after the start thereof, the discharge of the polymer powder was made impossible, which forced to discontinue the reactor operation. As the result of reactor overhaul, there were observed 25.3 kg of polymer stuck onto the inside wall thereof and polymer agglomerate in the form of belt put between the agitating blades and the inside wall, which agglomerate was presumed to have been once stuck onto the inside wall and then separated therefrom.

the styrenic polymer thus obtained had the following properties:

Bulk density of polymer powder: 0.29 g/cc
Conversion efficiency: 62.1%
Syndiotacticity: 98.3%
Weight-average molecular weight: 345,000

What is claimed is:

1. A process for producing a styrenic polymer having a high degree of syndiotactic configuration which comprises effecting polymerization reaction by continuously introducing a styrenic monomer as the starting material and a polymerization catalyst into a polymerization reactor, the inside of which has been brought into fluidized state by particles previously fed therein, said process being characterized in that the polymerization reactor temperature is controlled by vaporizing a part of the styrenic monomer which has been introduced into the polymerization reactor, while the inside of the reactor is maintained under reduced pressure, wherein the vaporized styrenic monomer is condensed in a condenser and the resultant condensate is utilized as at least a portion of the styrenic monomer as the starting material, and the polymerization reactor temperature is controlled by cascade control which links polymerization reactor temperature control to polymerization reactor pressure control through flow rate control of the condensed styrenic monomer refluxed to said polymerization reactor.

2. The process according to claim 1 wherein the polymerization reactor temperature is further controlled by reactor jacket cooling.

3. The process according to claim 1 wherein the polymerization reaction is continuously effected at a temperature from 20° to 100° C. and at a pressure of 5 mmHg abs to 500 mmHg abs.

* * * * *